United States Patent [19]

Bagley et al.

[11] 4,026,849

[45] May 31, 1977

[54] COMPOSITE COMPOSITIONS FROM GRAFT POLYMERIZED RIGID FILLERS

[75] Inventors: Edward B. Bagley, Morton; George F. Fanta, Peoria; William M. Doane, Morton; Lewis A. Gugliemelli, Pekin; Charles R. Russell, Peoria, all of Ill.

[73] Assignee: The United States of America as represented by the Secretary of Agriculture, Washington, D.C.

[22] Filed: Oct. 3, 1975

[21] Appl. No.: 619,412

[52] U.S. Cl. ............... 260/17.4 GC; 260/17.4 CL; 260/17.4 ST; 264/176 R
[51] Int. Cl.² ............ C08L 1/02; C08L 3/02; B28B 3/20
[58] Field of Search ............ 260/17.4 GC, 17.4 CL, 260/17.4 ST

[56] References Cited

UNITED STATES PATENTS

| | | | |
|---|---|---|---|
| 3,138,564 | 6/1964 | Borvnsky | 260/17 |
| 3,372,132 | 3/1968 | Cruz | 260/17.4 |
| 3,687,878 | 8/1972 | Imota et al. | 260/17.4 |
| 3,846,265 | 11/1974 | Yamaguchi et al. | 260/17.4 |
| 3,894,975 | 7/1975 | Gaylord | 260/17.4 |

Primary Examiner—Edward M. Woodberry
Attorney, Agent, or Firm—M. Howard Silverstein; David G. McConnell; Curtis P. Ribando

[57] ABSTRACT

Filled composite plastics are prepared, which consist entirely of a rigid filler which has been graft polymerized with a thermoplastic polymer. The conventional thermoplastic matrix has been eliminated. When the rigid filler is a polysaccharide, such as starch, a product with improved biodegradability is produced. Also, valuable petroleum reserves are conserved, since the polysaccharide portion serves as an extender for the petroleum-based polymer.

8 Claims, No Drawings

COMPOSITE COMPOSITIONS FROM GRAFT POLYMERIZED RIGID FILLERS

BACKGROUND OF THE INVENTION

Our invention relates to the preparation of filled thermoplastics. In particular, our invention relates to the graft polymerization of thermoplastic polymers onto and within the interstices of various rigid fillers to give filler-plastic combinations which, because of the chemical bonding between the filler and the thermoplastic, can be processed by conventional methods, e.g., extrusion.

The incorporation of rigid fillers such as glass, talc, silica, wood flour, limestone, asbestos, carbon black, zinc oxide, or alumina into thermoplastics has been practiced for years, and techniques for preparing filled thermoplastics are well known in the prior art [R. Seymour, Chem. Technol. 4: 422 (1974)]. Fillers are added to thermoplastics as extenders to give a less expensive final product and, more recently, to conserve valuable and dwindling petrochemical-based resources used in plastics production. Fillers are also added under certain circumstances to alter the physical properties of a manufactured plastic article, e.g., increase elastic modulus and reduce creep [L. E. Nielsen, Trans. Soc. Rheology 13(1): 141 (1969)].

Fillers generally become more compatible with the matrix polymer in which they are imbedded, if a small amount (i.e., less than 5%) of polymer is graft polymerized onto the filler surface. This small amount of grafted polymer need not be chemically the same as the thermoplastic matrix. The use of these graft polymerized fillers also produces plastic composites with high tensile strengths. The preparation of these graft polymerized fillers and their incorporation into plastics is known in the prior art [H. G. G. Dekking, J. Appl. Polym. Sci. 9: 1641 (1965) and I. E. Neimark, A. A. Chuiko, I. B. Slinyakova, SPE Trans. 2: 135 (1962)].

Fillers, including those containing a small amount of graft polymer, are generally blended with the thermoplastic matrix by mechanical mixing in amounts which may be as high as 50 volume percent of the total mixture. Mixing may be carried out on mill rolls or in a Banbury mixer and is done prior to extrusion processing. This separate mixing step is inconvenient and time consuming and thus adds to the cost of the finished plastic product. Moreover, completely homogeneous blends of the two basicly incompatible components are difficult to achieve.

We have discovered that rigid fillers, which have been graft polymerized with a sufficiently high percentage of a thermoplastic polymer (ideally, 40–50%, by weight) may be processed directly, in the absence of any other polymer or additive, into useful plastic articles by conventional methods, such as extrusion. Unlike the lightly grafted fillers in the prior art, the synthetic polymer portion is located not only on the filler surface but within the filler matrix. Thus, in the products prepared by the instant invention, the thermoplastic matrix polymer, which normally suspends the filler and which is a characteristic component of all conventional filled composites, has been completely eliminated to give a new plastic composition composed entirely of grafted rigid filler. The new composite compositions have a major advantage over the thermoplastic matrix-filler combinations known in the prior art, since they are a single chemical species (graft copolymer) and are thus completely homogeneous at the outset. A separate and costly mixing step prior to extrusion is therefore not required. Further, by the method of manufacture of this unique "filler-matrix" composite system the filler cannot aggregate but is uniformly and permanently distributed throughout the composite system.

DETAILED DESCRIPTION OF THE INVENTION

In prior art methods of preparing filled thermoplastics, the thermoplastic matrix and the filler (either ungrafted or graft polymerized with a small amount of polymer to improve compatibility of the two components and strength of the final product) are intimately mixed in a separate step and the mixture processed under conditions stringent enough to give a completely homogeneous mixture of filler and matrix. In practice, the loading level of filler (either grafted or ungrafted) in a thermoplastic matrix polymer will depend on a variety of factors. With spherical filler particles, an upper loading limit will be set by the geometry of packing. This will depend on both particle size and size distribution. For example, Leidner and Woodhams [J. Appl. Polym. Sci. 18: 2637 (1974)] used glass beads in a polyester resin at volume percentages ranging from 0–45%. Needle-shaped filler particles, on the other hand, can be used at higher loading levels; if the particles are aligned and closely packed. Often the loading limit will be determined by the processability of the filled system. Graft polymerized fillers in the prior art have been surface grafted (as opposed to grafting within the filler matrix) and thus usually contain only about 5% grafted polymer [Bixler et al., U.S. Pat. No. 3,471,439 and Mod. Plast. 45: 143 (1968)]. Due to the low synthetic polymer content, loading levels of graft polymerized fillers and the mixing and processing requirements for the filled plastics are about the same as for ungrafted fillers.

We were surprised when we discovered that certain rigid fillers, when graft polymerized with thermoplastic polymers to give a synthetic polymer content of about 40–50%, could be processed by conventional methods, such as extrusion, in the total absence of any added matrix polymer, to give useful composite plastics. We were further surprised when we found that our new plastic composites had mechanical properties comparable to those exhibited by conventional composite materials.

Die swell, or the Barus effect, is a common and critical problem in the extrusion of thermoplastics and refers to the swelling of a thermoplastic extrudate as it leaves the extruder die. For example, the thickness of an extruded ribbon of polyethylene is increased by as much as 50–500% over the thickness of the die, depending on the rate of flow through the extruder [Encycl. Polym. Sci. Technol. 8: 573 (1968)]. Distortion of extrudate due to die swell makes the design of extruder dies difficult, and it is difficult to extrude thermoplastics of precise dimensions and shape. Since the Barus effect is a generally observed phenomenon in the extrusion of thermoplastics, we were surprised when we observed little or no die swell when some of the composite compositions of the instant invention were extruded.

Starch-filled composite plastics are of particular interest, since the starch component makes the composite plastic biodegradable. Moreover, replacement of part of a petrochemical-derived plastic with a renewable agricultural resource helps conserve dwindling and costly petroleum reserves. Composites of the instant invention are therefore important from the point of view of both ecology and conservation.

Starch is a rigid high molecular weight polymer composed of repeating alpha-D-glucopyranosyl units and will not melt or soften on heating to temperatures as high as 200° C. Starch is composed of two polymeric types: straight chain amylose having a molecular weight of several hundred thousand, and branched chain amylopectin having a molecular weight of several million. Starch occurs in nature in the form of discrete, micron-sized granules which usually are made up of both amylose and amylopectin.

It is well known that starch in the granule state is insoluble in water at ambient temperatures. It is also known that when a water suspension of unmodified starch granules is heated, the granules first slowly and reversibly take up water with limited swelling and then, at a definite temperature, typically about 70° C., the granules irreversibly undergo a sudden rapid swelling. As the temperature is increased beyond about 70° C., more starch molecules diffuse from the granules until, at a temperature range of about 80° to 100° C., the starch appears completely dispersed. Starch in this form is referred to as being gelatinized. The starch used in graft polymerization reactions is derived from any number of plant sources and is either in the granule state or gelatinized or in any intermediate state; however, where possible, the use of gelatinized starch is preferred since the resulting graft copolymers are extruded with lower torque requirements. Starch which has been modified by treatment with acids, enzymes, oxidizing agents, or any other known method, are also useful for graft polymerization.

Other rigid fillers suitable for use in accordance with the invention include glass, cellulose, silica, wood flour, and carbon black.

Graft polymerization of vinyl and acrylic monomers onto starch and other polysaccharides is well known in the prior art, and a number of reviews on this subject have appeared in the literature [e.g., J. C. Arthur, Jr., Advan. Macromol. Chem. 2: 1 (1970)]. Any monomer yielding a thermoplastic polymer having a glass transition temperature below the decomposition temperature of starch (i.e., 180°–200° C.) is useful in the graft polymerization reaction. Examples of such monomers are: styrene, methyl methacrylate, methyl acrylate, butyl acrylate, butadiene, isoprene, and combinations of these monomers; although we do not intend that the useful monomers be limited to this list. Many methods are known for the initiation of graft polymerization, e.g., ceric ion, cobalt-60 irradiation, electron beam irradiation, ozone, ferrous ion-peroxide, or other redox systems; and any of these known methods will yield the composite compositions of the instant invention.

The percent add-on or weight percent synthetic polymer incorporated in the graft copolymer, a critical factor in the ease of processability of our composite compositions, is from about 20 to 95%. The lower limit for percent add-on as dictated by excess torque on the extruder, is about 30–40%, depending, of course, on the chemical nature of the monomer used and the glass transition temperature of the corresponding synthetic polymer as well as the limitations imposed by the extruder. We recognize, however, that lower values for percent add-on (e.g., 20–30%) can be tolerated if suitable plasticizers are incorporated in the composite compositions before processing or if processing machines capable of exerting higher torque are used. An upper limit for percent add-on is impossible to cite, since the limiting value of 100% would be pure synthetic polymer, which is a readily processable entity. Typically, we prefer that percent add-on be on the order of 45–55%.

Extrusion is the method typically used to process our composite materials; however, other processing techniques are considered to be equivalent for the purpose of the invention, e.g., milling between steel rolls, molding, injection molding, or vacuum forming.

The behavior of our new composite compositions is in direct contrast to the teachings of U.S. Pat. No. 3,332,897 which describes the preparation of moldable plastics by the graft polymerization of thermoplastic polymers onto polysaccharides followed by the derivatization of the polysaccharide component via an acylation reaction, e.g., reaction with acetic anhydride in pyridine. The acylation of the polysaccharide segment of the graft copolymers is an essential and critical feature of U.S. Pat. No. 3,332,897; and from this fact it may be deduced that continuous, well-formed plastic articles cannot be formed from polysaccharide graft copolymers if the acylation step were omitted. This is a reasonable deduction, since it is well known that esterification of starch hydroxyl groups confers thermoplastic properties onto the normally rigid and unsoftening starch matrix (L. H. Kruger and M. W. Rutenberg, in Starch: Chemistry and Technology, R. L. Whistler and E. F. Paschall, eds., Vol. 2, 1967, p. 390). In contrast to the teachings of U.S. Pat. No. 3,332,897, the composites of the instant invention require no derivatization of the polysaccharide segment prior to processing.

The uniqueness of our new composite materials is indicated by their behavior on blending with conventional, totally synthetic, thermoplastic polymers just prior to extrusion processing. When either an 80:20 or a 90:10 (by weight) mixture of purified starchstyrene graft copolymer (containing 40% polystyrene and 60% starch) and commercial polystyrene was extruded at 175° C., the resulting plastic was nonuniform and of poor quality and contained chunks of unfused solid, which were presumably graft copolymer. A similar unusable plastic was obtained from a 20:80 mixture of crude starchstyrene graft copolymer (containing 48% polystyrene and 52% starch) and commercial polystyrene. With inorganic fillers, mixtures of up to about 50% filler by weight are not uncommon [e.g., see Berger et al., Advan. Chem. Ser. 134: 73 (1974)], so the ratios of rigid component (starch) to total thermoplastic component (polystyrene) in the above blends are typical of those used industrially. Thus, attempts to use our new composite materials as conventional grafted fillers, by blending with a commercial thermoplastic polymer in a manner generally used in the preparation of filled composites, gave inferior plastics. However, when starch-styrene graft copolymers were extruded by themselves in the absence of any other added polymer, continuous uniform plastics of good quality were obtained. Needless to say, extrusion of a 60:40 (by weight) mixture of ungrafted corn starch and commercial polystyrene also gave a poorly formed and unusable plastic.

Another unique and unexpected feature of our new composite materials is their behavior toward plasticizers. Those skilled in the art would expect that if a certain polysaccharide graft copolymer gives an extrudate of inferior quality, the extrudate quality would be improved if the rigid, unsoftening polysaccharide component were plasticized with one of the hydrophilic plasticizers commonly used for starch, e.g., glycerol. This expectation is exactly the opposite of what was observed. When a starchpoly(methyl methacrylate) graft copolymer with 47% add-on was extruded at 175° C., with no other additives, a continuous plastic ribbon was obtained; however, the surface had a "frosty" appearance and the edges were jagged. Addition of 10% (by weight) of glycerol to the graft copolymer prior to extrusion did not improve the extrudate but, on the contrary, produced an extrudate which was so grossly deformed by die swell that it would be unusable.

However, addition of 10% (by weight) of dioctyl adipate, which is a highly hydrophobic plasticizer and which should thus have no effect on the starch component of the graft copolymer, produced a uniform, continuous plastic ribbon of good quality. It was also surprising that the amount of die swell in the dioctyl adipate-plasticized sample was much less than that in the graft copolymer which was extruded with no other additives.

Although the addition of glycerol to starch-poly(methyl methacrylate) prior to extrusion at 175° C. produced a plastic of inferior quality, the addition of water to starch-poly(methyl acrylate) permitted extrusion at a lower temperature and gave a plastic of excellent quality, provided the extrusion was carried out below 100° C. Addition of water to starch-polystyrene or starch-poly(methyl methacrylate) is not feasible, since the synthetic components of both of these graft copolymers have glass transition temperatures on the order of 100° C. Extrusion temperatures in excess of the boiling point of water would thus be required for processing; and this, in turn, would lead to bubbles and imperfections in the final plastic due to the flashing off of water vapor.

Contrary to what might be expected of a plastic which contains about 50% starch, our composite materials do not disintegrate, but remain strong and continuous on prolonged soaking in water at room temperature, even though they may absorb a considerable amount of water. Properties of the plastics are dependent on water content. For example, on soaking in water, a starch-poly(methyl acrylate) plastic is transformed from a stiff, leather-like material to a soft, pliable rubber.

Although our composite materials remain strong and do not disintegrate in water, they will biodegrade readily when incubated with common organisms.

Although the mechanism is not completely understood, we feel that the remarkable behavior of our composite materials is due to a combination of the properties of the rigid portion and the thermoplastic portion of the composite, brought about by the chemical bonding between these two entities. The rigid portion prevents the composite from actually melting in the extruder barrel and die, whereas the thermoplastic portion permits the composite particles to soften sufficiently to enable them to fuse together to give a continuous plastic under the high internal pressures encountered in an extruder. Thus, the unique marriage of properties apparently produces behavior in an extruder which may be described as the flow of a heat-softened powder coupled with pressure-fusion. To support this theory, we have observed that the composite material remaining in the barrel of the extruder is mostly unfused, presumably due to insufficient pressure on the particles. However, composite material remaining in the die is in the form of a uniform, continuous plastic because of the high pressures encountered in this particular zone of the extruder.

The following examples are intended only as illustrative embodiments and should not limit the scope of the invention.

EXAMPLE 1

A starch-polystyrene graft copolymer (SS-1) was prepared by thoroughly blending 40 g. (dry basis) of unmodified corn starch (water content 10–15%), 40 g. of styrene, and 10 ml. of water. Oxygen was removed by repeated evacuation followed by repressuring with nitrogen. The mixture was irradiated with gamma rays from cobalt-60 for 62 minutes to give a total dose of 1 Mrad. The irradiated reaction mass was allowed to stand at ambient temperature for 2 hours and was then blended with ethanol. The polymer was removed by filtration, washed with ethanol, and dried. The reaction was repeated four times and the products combined. The average weight percent polystyrene in the graft copolymer (percent add-on) was 48% as calculated from the gain in weight of starch.

EXAMPLE 2

A starch-polystyrene graft copolymer (SS-2), free of ungrafted homopolymer, was prepared as in Example 1, except that the reaction mass was subjected to prolonged extraction with five separate portions of benzene before work-up by ethanol precipitation. In three reactions, the average percent add-on was 40%, as calculated from the gain in weight of starch. There was a 10% conversion of styrene to ungrafted homopolymer.

EXAMPLE 3

Mixtures of the starch-polystyrene graft copolymer of Example 1 (SS-1) and other components were passed through a 3/4-inch extruder (L/D ratio of 10/1; compression ratio of screw, 2:1) attached to a Brabender Plasti-Corder. Extrusions were made through a 1 × ⅛ inch slit die.

A. A mixture of 20 g. SS-1, 6 g. glycerol (a hydrophilic plasticizer), and 80 g. pulverized commercial polystyrene (Dylene resin, Sinclair-Koppers Company) was extruded at 150° C. and the extrudate repassed through the extruder at 175° C. The final extrudate was opaque, had a pebbly surface, and was grossly deformed due to die swell.

B. A mixture of 50 g. SS-1, 30 g. glycerol, and 50 g. Dylene resin was extruded at 150° C. (2 passes). The extrudate had a rough surface, was completely opaque, and was a crumbly solid with little strength. Die swell was observed, and glycerol tended to bleed out from the cooled sample.

C. A mixture of 20 g. SS-1 and 80 g. Dylene resin was extruded at 150° C. (2 passes). The extrudate had a rough surface and exhibited die swell (maximum ribbon thickness of one-fourth inch). The extruded ribbon was transluscent, but was filled with particles of unfluxed SS-1.

D. The mixture of Example 3A was extruded at 150° C. (2 passes). The extrudate had a similar appearance to that of Example 3A, except for some reduction in the amount of die swell (maximum ribbon thickness of one-fourth inch).

E. A mixture of 20 g. SS-1, 80 g. Dylene resin, and 6 g. of an experimental hydrophobic plasticizer, prepared from the reaction of glycol glycoside [Otey et al., Cereal Sci. Today 13: 199 (1968)] with a mixture of octanoyl chloride, steroyl chloride, and benzoyl chloride was extruded at 150° C. (2 passes). The extrudate was a transluscent, well-formed plastic; however, the surface was pebbly, and the extruded ribbon exhibited die swell (maximum ribbon thickness of three-sixteenths inch).

EXAMPLE 4

SS-1, with no other additives, was extruded under the same conditions as Example 3.

A. At 150° C. (2 passes), the extrudate was a continuous ribbon with little or no unfluxed solid, and there was no die swell (ribbon thickness 0.127 inch). The surface of the extruded ribbon had a powdery appearance.

B. At 190° C. (2 passes), the extrudate was a tan-colored, continuous, well-formed, translucent ribbon with no die swell (ribbon thickness 0.127 inch). The surface was smooth and glossy.

C. At 175° C. (2 passes), the extrudate resembled that of Example 4B, but was a lighter color. Instron tests of milled specimens showed tensile strengths in the range 7,500–9,100 p.s.i. Izod impact values were on the order of 0.4 ft. lb./inch notch. These tensile and impact values are higher than those typically shown by general purpose polystyrene plastics [H. Keskkula, Encycl. Polym. Sci. Technol. 13: 396 (1970)].

EXAMPLE 5

The starch-polystyrene graft copolymer of Example 2 (SS-2) was extruded under the same conditions as Example 3. At 175° C. (2 passes), a tan extrudate of good quality was obtained which resembled that of Example 4C. There was no die swell (ribbon thickness 0.126 inch).

EXAMPLE 6

The starch-polystyrene graft copolymer of Example 2 (SS-2) was mixed with different proportions of pulverized Dylene resin and extruded under the same conditions as Example 3.

A. An 80:20 (by weight) mixture of SS-2 and Dylene resin was extruded at 175° C. (2 passes). The extrudate was not as translucent as that of Example 5 and contained particles of unfused polymer.

B. A 90:10 (by weight) mixture of SS-2 and Dylene resin was extruded at 175° C. (3 passes). Addition of this percentage of Dylene resin approximates the graft copolymer of Example 1, in which the ungrafted homopolymer has not been removed. The extruded ribbon was of poor quality and resembled that of Example 6A.

EXAMPLE 7

A physical mixture of 60 g. (dry basis) of corn starch (moisture content, 12.2%) and 40 g. of pulverized Dylene resin was extruded at 175° C., under the conditions of Example 3. Even after 4 passes through the extruder, the extrudate was rough, poorly formed, and completely opaque.

EXAMPLE 8

The following procedure was used to synthesize a graft copolymer of granular corn starch and poly(methyl acrylate). A suspension of 250 g. (dry basis) of corn starch (water content 10%) in 2 liters of water was stirred and purged with a stream of nitrogen for 1 hour at room temperaure. Three hundred grams of methyl acrylate were added followed, after 5 minutes, by 8.45 g. of ceric ammonium nitrate dissolved in 25 ml. of 1N nitric acid. The mixture was allowed to stir under nitrogen for 3 hours and the supernatant was then decanted from the precipitated solid. The solid was washed first with water and then with methanol and was finally dried overnight in a forced air oven at 35° C. The yield of crude polymer was 446 g. (water content 4.5%). Ungrafted poly(methyl acrylate) was removed from a 200-g. portion of crude polymer by first moistening the product with 80 ml. of water and then exhaustively extracting it with benzene. The weight of purified graft copolymer after extraction was 184 g., and 6.3 g. of poly(methyl acrylate) was isolated from the benzene extracts. The percent add-on of the purified graft copolymer was calculated at 39%, from the gain in weight of starch.

EXAMPLE 9

The following procedure was used to synthesize a graft copolymer of gelatinized corn starch and poly(methyl acrylate). A suspension of 100 g. (dry basis) of corn starch (water content 10%) in 2.5 liters of water was stirred and purged with a stream of nitrogen while heating to 85° C. The mixture was stirred at 85° C. for 30 minutes and then cooled to room temperature. Methyl acrylate (120g.) was added, followed after 5 minutes by 3.39 g. of ceric ammonium nitrate dissolved in 25 ml. of 1N nitric acid. After the mixture had stirred for 3 hours under nitrogen, 1 liter of methanol was added and the precipitated solid was removed by filtration, washed with methanol, and dried in a forced air oven at 35° C. The crude polymer was moistened with 80 ml. of water and exhaustively extracted with benzene to remove ungrafted poly(methyl acrylate). The yield of purified graft copolymer was 179 g., and 6.8 g. of poly(methyl acrylate) was isolated from the benzene extracts. The percent add-on of the purified graft copolymer was calculated at 44%, from the gain in weight of starch.

EXAMPLE 10

The purified granular starch-poly(methyl acrylate) graft copolymer of Example 8 was extruded under the conditions given in Example 3, except that a 1 × 0.020 inch slit die was used. Three passes through the extruder at a barrel temperature of 150° and a die temperature of 160° C. yielded a smooth, transluscent, well-formed extrudate with minimal die swell (ribbon thickness 0.023 inch). The extruded ribbon was a leathery plastic which fractured when bent over double. The tensile strength was 3,000 p.s.i. Lowering the barrel and die temperatures to 125° C. gave a totally unfluxed powder.

EXAMPLE 11

A. The purified gelatinized starch-poly(methyl acrylate) graft copolymer of Example 9 was extruded through a 1 × 0.020 inch slit die under the conditions given in Example 3. One pass through the extruder at a barrel temperature of 125° C. and a die temperature of 140° C. gave a plastic ribbon resembling that of Example 10, but less brittle. Die swell was minimal (ribbon thickness 0.022 inch), and the tensile strength was approximately 2,500 p.s.i. Lowering the barrel and die temperature to 100° C. still produced a continuous plastic ribbon, although there was an appreciable amount of unfluxed polymer.

B. Eighty grams of the purified gelatinized starch-poly(methyl acrylate) graft copolymer of Example 9 was mixed with 20 ml. of water. The mixture was allowed to equilibrate for 2 hours and was then extruded through a 1 × 0.020 inch slit die under the conditions given in Example 3. One pass through the extruder at a barrel temperature of 90° C. and a die temperature of 95° C. gave a tough, translucent, leather-like plastic ribbon which showed no tendency toward brittle fractures. The extrudate had a pebbly surface, and the ribbon thickness was 0.025 inch.

EXAMPLE 12

The following procedure was used to synthesize a graft copolymer of cellulose and poly(methyl acrylate). A suspension of 53.2 g. of wood cellulose in 2 liters of water was stirred and purged with a stream of nitrogen for 1 hour. Methyl acrylate (63.7 g.) was added followed after 5 minutes by 1.8 g. of ceric ammonium nitrate dissolved in 25 ml. of 1N nitric acid. The mixture was allowed to stir under nitrogen for 4 hours and was then filtered. The solid was washed with ethanol and dried overnight in a forced air oven at 35° C. The crude polymer was freed of ungrafted poly(methyl acrylate) by first moistening it with 40 ml. of water and then exhaustively extracting it with benzene. The weight of purified graft copolymer after extraction was 104 g., and 4.1 g. of poly(methyl acrylate) was recovered from the benzene extracts. The percent add-on of the purified graft copolymer was calculated at 49%, from the gain in weight of cellulose.

EXAMPLE 13

A. The purified cellulose-poly(methyl acrylate) graft copolymer of Example 12 was extruded through a 1 × 0.020 inch slit die under the conditions given in Example 3. A single pass through the extruder at 125° C. gave a smooth, continuous plastic ribbon with minimal die swell (ribbon thickness 0.022 inch). Some areas of the specimen were transluscent; however, there were fibrous flocks of unfused polymer imbedded in the plastic, which gave the extrudate a desirable marble-like appearance. Extrusion at 150° C. did not greatly change the appearance of the extrudate.

B. Forty grams of the purified cellulose-poly(methyl acrylate) graft copolymer of Example 12 was mixed with 10 ml. of water. The mixture was allowed to equilibrate for about 1 hour and was then extruded through a 1 × 0.020 inch slit die under the conditions given in Example 3. One pass through the extruder at a barrel temperature of 95° C. and a die temperature of 110° C. gave a stiff, leathery, opaque plastic with a very fibrous appearance.

EXAMPLE 14

The following procedure was used to synthesize a graft terpolymer of gelatinized corn starch, poly(-methyl acrylate), and poly(n-butyl acrylate). A suspension of 100 g. (dry basis) of corn starch (water content 12%) in 2.5 liters of water was stirred and purged with a stream of nitrogen while heating to 85° C. The mixture was stirred at 85° C. for 30 minutes and then cooled to room temperature. Methyl acrylate (75 g.) and 75 g. of n-butyl acrylate were added, followed after 5 minutes by 3.39 g. of ceric ammonium nitrate dissolved in 25 ml. of 1N nitric acid. After the mixture had been stirred for 3 hours under nitrogen, 1 liter of methanol was added and the precipitated solid removed by filtration, washed with methanol, and dried in a forced air oven at 35° C. The crude polymer was moistened with 80 ml. of water and exhaustively extracted with benzene to remove ungrafted homopolymer. The yield of purified graft copolymer was 212.9 g., and 11.8 g. of homopolymer was isolated from the benzene extracts. The percent add-on of the purified graft copolymer was calculated at 53%, from the gain in weight of starch.

EXAMPLE 15

A. The purified graft terpolymer of gelatinized corn starch, poly(methyl acrylate), and poly(n-butyl acrylate), prepared in Example 14, was extruded through a 1 × 0.020 inch slit die under the conditions given in Example 3. Extrusion at 100° C. gave a poorly fused extrudate. Formation was better at 125° C., and two passes at this temperature gave a supple, transluscent plastic. Die swell was minimal (ribbon thickness 0.022 inch).

B. Forty grams of the purified graft terpolymer prepared in Example 14 was mixed with 10 ml. of water. The mixture was allowed to equilibrate overnight and was then extruded through a 1 × 0.020 inch slit die under the conditions given in Example 3. Two passes through the extruder at 95° C. gave a soft, supple, leather-like, transluscent plastic with minimal die swell (ribbon thickness 0.023 inch). When a portion of this plastic was allowed to stand at room temperature in an open dish, the sample lost 9.6% of its original weight in 25.5 hours, due to the evaporation of water. There was little additional water loss from the sample, since after 4 days the sample lost only 9.8% of its original weight. The sample remained soft and supple.

EXAMPLE 16

The following procedure was used to synthesize a graft copolymer of gelatinized corn starch and poly(-methyl methacrylate). A suspension of 100 g. (dry basis) of corn starch (water content 10%) in 2.5 liters of water was stirred and purged with a stream of nitrogen while heating to 85° C. The mixture was stirred at 85° C. for 30 minutes and was then cooled to room temperature. Methyl methacrylate (160 g.) was added followed after 5 minutes by 3.39 g. of ceric ammonium nitrate dissolved in 25 ml. of 1N nitric acid. After the mixture had stirred for 3 hours under nitrogen, 1 liter of methanol was added and the precipitated solid was removed by filtration, washed with methanol, and dried in a forced air oven at 40° C. The crude polymer was ground to pass a 20-mesh screen, moistened with 100 ml. of water, and then exhaustively extracted with 1,2-dichloroethane and benzene to remove ungrafted poly(methyl methacrylate). The yield of purified graft copolymer was 188 g., and 53 g. of poly(methyl methacrylate) was isolated from the organic extracts. The percent add-on of the purified graft copolymer was calculated at 47%, from the gain in weight of starch.

EXAMPLE 17

The purified starch-poly(methyl methacrylate) graft copolymer of Example 16 was extruded under the same conditions as Example 3.

A. A mixture of 45 g. of graft copolymer and 5 g. of a commercial dioctyladipate plasticizer was extruded at 175° C. (2 passes). The final extrudate was a tan-colored, continuous, well-formed, opaque ribbon with a thickness of 0.135 inch. The surface of the ribbon showed "frosty" die marks.

B. A mixture of 45 g. of graft copolymer and 5 g. of glycerol was extruded under the same conditions as Example 17A. The final extrudate was well formed but was grossly distorted due to die swell.

C. The graft copolymer, with no other additives, was extruded under the same conditions as Example 17A. The final extrudate was well formed, but the surface had a "frostier" appearance than that of Example 17A. Also, the edges of the ribbon were jagged, and the extrudate showed appreciable die swell (ribbon thickness 0.175–0.200 inch).

EXAMPLE 18

Extruded plastics absorb water but remain continuous and strong and show no tendency to disintegrate.

A. A portion of the ⅛-inch starch-polystyrene plastic ribbon of Example 4C was allowed to soak in water at room temperature and the percent increases in weight and thickness recorded as a function of time, Table 1.

After soaking for 476 hours, the specimen was white and opaque, but the surface was still hard and could be barely dented with the fingernail.

Table 1

| Time | % Increase | |
| (hours) | In weight | In thickness |
| --- | --- | --- |
| 0 | — | — |
| 22.5 | 5.0 | 5.6 |
| 50.5 | 8.0 | 7.9 |
| 145.0 | 14.8 | 12.7 |
| 194.0 | 15.7 | 12.7 |
| 476.0 | 16.0 | 12.7 |

B. A portion of the 0.022-inch starch-poly(methyl acrylate) ribbon of Example 11A was allowed to soak in water at room temperature and the percent increases in weight and thickness recorded as a function of time, Table 2.

After soaking for 476 hours, the specimen was soft, white, pliable, and rubbery. It was still strong and was not the least bit sticky.

Table 2

| Time | % Increase | | |
| (hours) | In weight | In thickness | In width |
| --- | --- | --- | --- |
| 0 | — | — | — |

Table 2-continued

| Time | % Increase | | |
| (hours) | In weight | In thickness | In width |
| --- | --- | --- | --- |
| 22.5 | 54 | 41 | 12.5 |
| 476.0 | 53 | 41 | 12.5 |

EXAMPLE 19

Extruded plastics biodegrade readily. A portion of the starch-poly(methyl acrylate) plastic ribbon of Example 11 was incubated for 5 days at 25° C. with three different cultures in a nutrient solution suggested by ASTM D1924 (0.7004 g. $KH_2PO_4$, 0.7008 g. $K_2HPO_4$, 0.6985 g. $MgSO_4 \cdot 7H_2O$, 1.0020 g. $NH_4NO_3$, 0.0050 g. NaCl, 0.0028 g. $Fe(NH_4)_2(SO_4)_2 \cdot 6H_2O$, 0.0020 g. $ZnSO_4 \cdot 7H_2O$, 0.0006 g. $MnSO_4 \cdot H_2O$, 15.0 g. Agar). *Aspergillus niger* and *Trichoderma viride* gave good growth and sporulation. *Penicillium funiculosum* produced little sporulation but gave good growth.

We claim:

1. A method of preparing a filled plastic article comprising the step of extruding a plastic composite composition consisting essentially of the polymer matrix resulting from grafting onto a rigid filler a thermoplastic polymer having a glass transition temperature of less than about 200° C., wherein said thermoplastic polymer is present in an amount equal to from 20 to 95%, by weight, of the total composition.

2. A method as described in claim 1, wherein the rigid filler is either granular or gelatinized starch.

3. A method as described in claim 1, wherein the rigid filler is cellulose.

4. A method as described in claim 1, wherein the rigid filler is granular or gelatinized starch and the thermoplastic polymer is chosen from the group: polystyrene, poly(methyl acrylate), poly(n-butyl acrylate), poly(methyl methacrylate), or a combination of the above.

5. A method as described in claim 1, wherein the rigid filler is cellulose and the thermoplastic polymer is poly(methyl acrylate).

6. A method as described in claim 1, wherein the thermoplastic polymer is present in amounts equal to 30 to 60%, by weight, of the total composition.

7. A method as described in claim 1, wherein the thermoplastic polymer is present in amounts equal to 45 to 55%, by weight, of the total composition.

8. The filled plastic article produced by the method of claim 1.

* * * * *